March 5, 1946. H. Z. MARTIN 2,396,109
TREATING HYDROCARBON FLUIDS
Filed Nov. 6, 1941
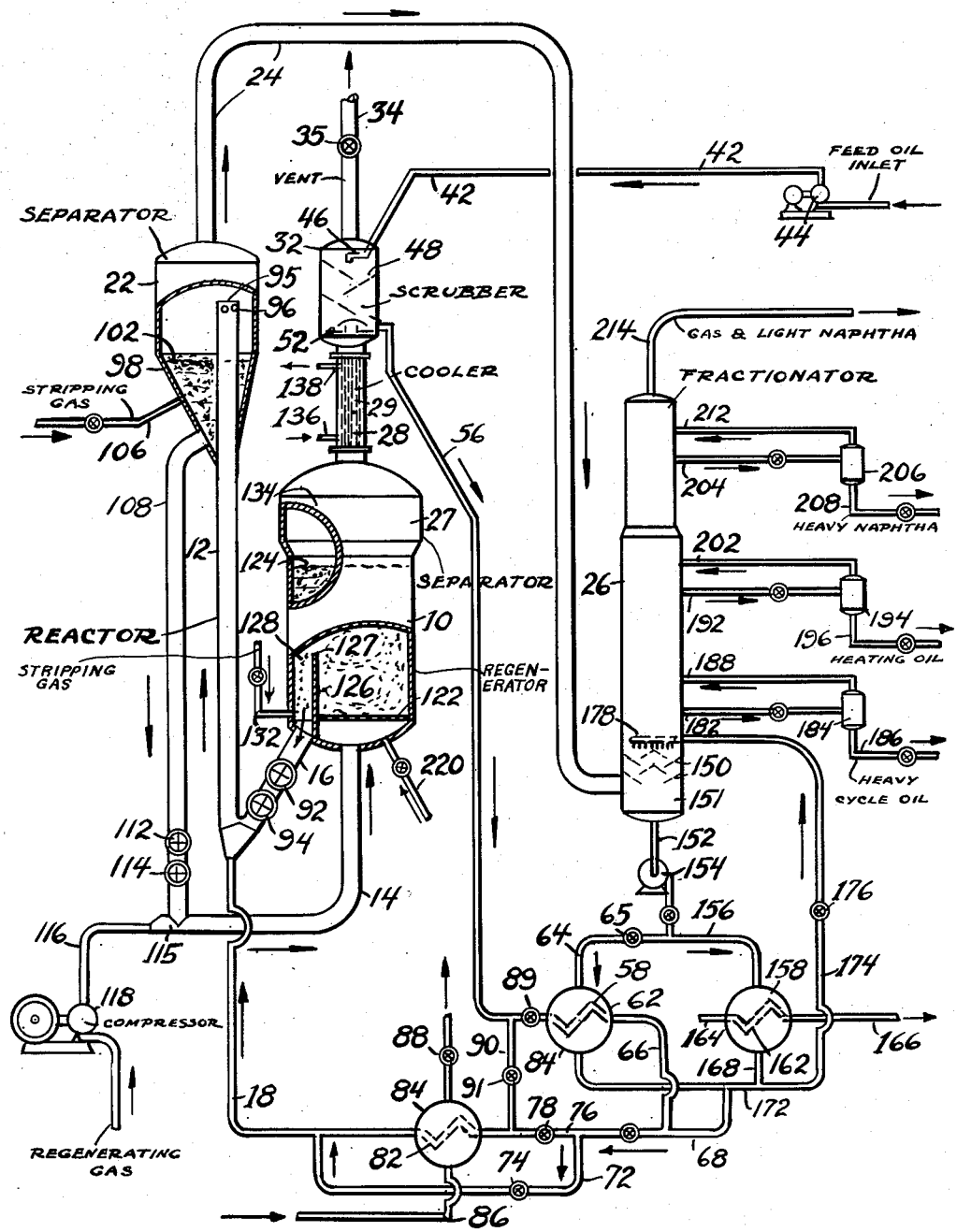
Homer Z. Martin Inventor
By P. L. Young Attorney Patented Mar. 5, 1946

2,396,109

UNITED STATES PATENT OFFICE 2,396,109

TREATING HYDROCARBON FLUIDS

Homer Z. Martin, Cranford, N. J., assignor to Standard Oil Development Company, a corporation of Delaware Application November 6, 1941, Serial No. 417,992

6 Claims. (Cl. 196—52)

This invention relates to catalytic reactions and more particularly relates to catalytic reactions resulting in the production of desired hydrocarbons of relatively low boiling point.

The invention is so carried out that the heat produced during regeneration is used to heat the reactants to the reaction temperature. For example, in the catalytic cracking of hydrocarbons carbonaceous material is deposited on the catalyst particles during cracking and in regenerating the catalyst particles heat is produced by burning the carbonaceous material. This heat produced during regeneration is used to preheat the oil to be cracked and is also used for raising the temperature of the oil to a cracking temperature and for maintaining the temperature during cracking. In this way a preheating furnace such as fired coil is eliminated. No coolers are used with the regeneration zone for cooling the regenerated catalyst and for regulating or controlling the temperature during regeneration.

More specifically, the regeneration gases leaving the regeneration zone are cooled and then scrubbed with oil feed to recover finely divided solid particles from the regeneration gases. As the regeneration gases are at an elevated temperature, the oil will be preheated. However, where the oil is a high coke forming stock, the oil will be preferably cooled after passing through the scrubber. The preheated oil feed, when of a low coke-forming stock, may then be further heated by indirect heat exchange with bottoms from the fractionator whereby heat is recovered from the reaction products leaving the reaction zone, or, it may be cooled as above described when it is a high coke-forming stock.

The preheated or cooled oil is then mixed with hot regenerated finely divided solid particles and passed through a reaction zone. In order to supply sufficient heat to the oil a solid heat carrier in finely divided form is added to the catalyst particles. The reaction products are separated from the finely divided catalyst particles and solid carrier particles and the solid particles are passed to the regeneration zone where carbonaceous material is burned from the catalyst particles and solid carrier particles. In cases where insufficient coke is formed on the catalyst particles to supply the desired heat to the solid particles, fuel may be added to the regeneration zone to supply additional heat.

The separated reaction products are passed to suitable equipment for any desired separation or fractionation. Any solid particles carried over with the vaporous reaction products from the reaction zone are recovered in the fractionation step or condensation step.

In this invention the gases and vapors pass through the reaction zone at a relatively high velocity whereas the gases pass through the regeneration zone at a relatively low velocity. In this way the mixture of solid particles and gases or vapors passing through the reaction zone has a relatively low density whereas the mixture in the regeneration zone has a relatively high density. The regenerated catalyst particles and solid heat carrier particles are withdrawn from the bottom portion of the regeneration zone.

Separating zones for separating solid particles from gases and vapors are provided for the reaction and regeneration zones so that cyclone separators are preferably eliminated. In some instances cyclone separators may be used but a cheaper process results by eliminating them. The regeneration zone is supported in any suitable manner and may be supported near ground level. The regeneration zone is under superatmospheric pressure.

In the drawing, the figure represents one form of apparatus which may be used to practice the invention.

Referring now to the drawing, the reference character 10 designates a regeneration zone or vessel and the reference character 12 designates a reaction zone or vessel. The finely divided solid particles to be regenerated are introduced into the bottom portion of the regeneration zone 10 through line 14. The regenerated finely divided solid particles are withdrawn from the bottom portion of the regeneration zone 10 through standpipe 16 and are mixed with preheated liquid oil to be cracked, the oil being introduced into the bottom portion of the reaction zone 12 through line 18. To accelerate vaporizing the oil stream is preferably subdivided into a plurality of streams when it is introduced into reaction zone 12.

The mixture of reaction products in vapor form and solid particles is passed to a separator 22 for separating solid particles from vapors and the vapors pass overhead through line 24 to a fractionating tower 26. Separator 22 will be hereinafter described in greater detail.

The regeneration zone 10 is provided with a separating zone or section 27 at its upper portion for separating regenerated solid particles from regeneration gases. The separated regeneration gases pass upwardly through a cooler 28 preferably provided with a plurality of vertical tubes 29 for cooling the regeneration gases. The regeneration gases are then passed to a scrubber 32 wherein they are directly contacted with oil feed to remove solid particles from the regeneration gases. The regeneration gases freed of solid particles leave the top of the scrubber through line 34 provided with a valve 35 and are passed to the atmosphere.

The invention will now be more particularly described. Liquid oil such as reduced crude or gas oil is passed through line 42 by means of pump 44 into the upper portion of the scrubber 32 into which it is sprayed by means of a spray head or sprinkler 46. The sprayed oil passes downwardly in countercurrent direction to the upflowing regeneration gases passing through the scrubber. As shown in the drawing, scrubber 32 has baffles 48 for causing the oil to provide large surface for contacting with gases and for causing the upflowing regeneration gases to follow a tortuous path. Instead of a baffled tower, an open spray tower may be used. Instead of baffles, disc and doughnut type towers or packed towers containing tile, etc., may be used.

The preheated oil containing the solid particles scrubbed out of the regeneration gases is collected on a tray or bubble cap 52 and leaves the scrubber through line 53. When the oil is of a low coke-forming stock, it is preferably further preheated by passing through a coil 58 in a heat exchanger 62 where it is indirectly contacted with at least a portion of the bottoms withdrawn from the fractionating tower 26 and passing through line 64 having valve 65. The bottoms solid particles scrubbed out in tower 26 will be later described in greater detail. The further heated oil feed is then passed through line 66 where it may be added to at least a part of the bottoms leaving the heat exchanger 62 through line 68. The mixture of bottoms and preheated feed oil may then be passed through line 72 having a valve 74 and then through line 18 to the reactor or reaction zone 12.

If the feed oil is at too high a temperature, it may be passed through line 76 having valve 78 and through the coil 82 in heat exchanger 84 where it indirectly contacts water introduced into the heat exchanger 84 through line 86. Some of the heat is absorbed by the water and hot water and/or steam is produced which leaves the heat exchanger through line 88. If the feed oil is a high coke-forming stock, it is preferably by-passed around heat exchanger 62. Valve 89 in line 56 is closed and the oil is passed through by-pass line 90 having valve 91 and then through heat exchanger 84 to cool the oil. Valve 78 in line 76 is left open to permit mixture of at least a portion of the slurry in line 68 with the oil feed.

The preheated or cooled feed oil passing through line 18 is then mixed with regenerated hot finely divided solid particles withdrawn from the regenerator through line 16. The hot regenerated solid particles are at an elevated temperature above the reaction temperature and they are used in sufficient amount to heat the feed oil to vaporize it and maintain it at the reaction temperature during passage through the reaction zone 12.

If only catalyst particles were used, the proportion of catalyst particles to the oil vapors would be too great and the time of reaction would have to be exceedingly short and uncontrollable or overcracking would result. In order to bring the time of reaction within reasonable limits, the solid heat carrier of low or no catalytic activity, such as, pumice or kieselguhr is mixed with the solid catalyst particles such as acid treated bentonite clay and this mixture is the one withdrawn from the regeneration zone through line 16.

The reaction zone or vessel 12 is an upflow reactor of a relatively small diameter and the velocity of the oil vapors passing upwardly through the reactor is maintained relatively high so that the density of the mixture is relatively low and the time of reaction is relatively short. In the reaction zone there is a high catalyst to oil ratio and low holdup of catalyst particles.

The standpipe 16 associated with the regeneration zone 10 is provided with a valve 92 and another valve 94. One of these valves may be provided as a shut off valve and the other may be provided for automatically controlling the amount of regenerated finely divided solid particles being withdrawn from the regeneration zone 10 through line 16. In the regeneration zone 10 the finely divided solid particles are aerated or fluidized and assume many of the characteristics of a liquid. The solid particles flow from the regeneration zone 10 through the standpipe 16 in the manner of a liquid.

The upper portion of the reaction zone or vessel 12 extends into the enlarged zone which forms the separator 22. As shown in the drawing, the upper portion of the reaction zone in the separator 22 is provided with a closed end 95 and lateral openings 96 for introducing the vaporous reaction products and fouled finely divided solid particles into the separator 22. The enlarged volume provided by the separator 22 effects a separation of the solid particles from the vaporous reaction products by reducing the velocity of the vapors. The reduction in the velocity of the vapors causes settling or dropping of the solid particles and the separated solid particles are collected in the hopper 98 forming the lower part of the separator 22. The hopper 98 surrounds the upper portion of the reaction zone 12.

The level of the separated catalyst particles is shown in one position at 102 but may vary during the operation of the process. Preferably, a stripping gas such as steam is introduced into the bottom portion of the hopper 98 through line 106 to remove volatile hydrocarbons from the finely divided solid particles. Instead of the closed end 95 and openings 96, the end of the reaction zone may be open and the upper portion of the reaction zone 12 may have a spiral separator therein or a deflector may be provided in separator 22 above the open end of the reaction zone 12.

The finely divided solid particles in the hopper 98 are maintained in fluidized condition and are withdrawn from the bottom portion of the hopper 98 and passed into a standpipe 108. If desired, more stripping steam may be introduced into the standpipe 108. The lower portion of the standpipe 108 is provided with valves 112 and 114. One of these valves may be a shut off valve and the other valve provided for automatically controlling the amount of fouled finely divided particles being withdrawn from the bottom of the standpipe 108. The solid particles in the standpipe 108 are maintained in a fluidized condition so that they flow like a liquid and also produce a pressure at the bottom of the standpipe. This pressure is used to pass the fouled solid particles to the regeneration zone 10.

A regenerating gas such as air or other suitable oxidizing agent is introduced into mixing zone 115 through line 116 for admixture with regenerated solid particles introduced into zone 115 from the standpipe 108. As the regeneration zone is preferably maintained under superatmospheric pressure, a compressor 118 is provided for supplying the regeneration gas to the regeneration zone 10.

The mixture of fouled finely divided solid particles and regenerating gas is passed through line 14 and introduced into the bottom portion of the regeneration zone 10. It is passed upwardly through a distribution plate 122. The regenerating gas is supplied at a relatively low velocity so that the mixture of catalyst or finely divided particles and regenerating gas is maintained in a relatively dense condition. The velocity of the regenerating gas is such as to maintain the solid particles undergoing regeneration in a turbulent and mobile state. The solid particles in fluidized condition have a level shown at 124 which is not a quiescent level but is more like the surface of a violently boiling liquid. In the drawing, the level is shown in one position but this level may be higher or lower and is not at any fixed position. The solid particles are maintained in the regeneration zone for a sufficient period of time to remove a large part of the carbonaceous material therefrom.

At one side in its bottom portion the regeneration zone 10 is provided with a partition 126 which has its upper portion 127 below the level of fluidized solid particles shown at 124. The partition 126 provides a draw-off compartment 128 from which the regenerated solid particles are withdrawn and flowed into standpipe 16 previously described. Preferably, a stripping gas such as steam is introduced into the bottom portion of the draw-off compartment 128 through line 132 to remove residual oxygen-containing gases from the regenerated solid particles. Instead of or in addition to steam or the like a combustible gas such as a hydrocarbon gas may be introduced through line 132 to reduce the oxygen concentration in the gas in compartment 128.

The regeneration gases leaving the regeneration zone 10 pass into the enlarged space forming the separator 27 and due to this enlarged space the velocity of the regeneration gases is reduced and further separation of solid particles takes place. The regeneration gases flowing upwardly through the separator 27 still contain a small portion of finely divided solid particles and these are removed in the scrubber 32. The regeneration gases are at a relatively high temperature and they are preferably first cooled by passing through the cooler 28. A liquid inlet 136 and an outlet 138 are provided for the cooling medium for the cooler 28. The cooled regeneration gases are then scrubbed with the fresh feed oil in the scrubber 32 as hereinbefore described to remove solid particles from the gases and during the scrubbing action the feed oil is also preheated to a certain extent.

Returning now to the reaction products in vapor form leaving the separator 22 through line 24, the reaction products are introduced into the bottom portion of the fractionating tower 26 below a baffle arrangement 150. The reaction products are at a relatively high temperature and it is necessary to remove some of the heat from the reaction products. This is done in a desuperheating zone 151 below the baffle arrangement 150. Bottoms are withdrawn from the fractionating tower 26 through line 152 by pump 154 and at least a part passed through line 64 and heat exchanger 62 for certain oil stocks as hereinbefore described.

At least another portion of the withdrawn bottoms is passed through line 156 and heat exchanger 158 where the bottoms are contacted with a coil 162 containing a heat exchange liquid. For example, water may be introduced into the coil 162 through line 164 and steam removed through line 166. The cooled bottoms are then withdrawn from the heat exchanger 158 and passed through line 168. A portion of the partly cooled bottoms may be passed through line 172 for admixture with the other portion of bottoms which passed through heat exchanger 62 and this mixture passed through line 68 where it is further mixed with preheated feed oil passing through line 66 or with feed oil passing through by-pass line 90.

The other portion of the cooled bottoms from line 168 is passed through line 174 having a valve 176 and then into the bottom portion of the fractionating tower 26 above the baffle arrangement 150. The cooled bottoms are sprayed over the baffle arrangement by means of a spray head or other means 178. The cooled oil contacts the reaction vapors and by direct heat exchange removes heat from the reaction products. During this desuperheating action, some of the heavier constituents in the reaction products are condensed and residual solid particles carried over with the vaporous reaction products are washed out of the vapors. The bottoms withdrawn from the fractionating tower 26 through line 152 contain the solid particles which were scrubbed out of the reaction product vapors.

As above pointed out, some of these bottoms are cooled and recycled to the bottom of the fractionating zone 26, whereas at least another portion of the bottoms is used to preheat the feed oil if the oil is of low coke-forming stock. If the feed oil is of high coke-forming stock, heat exchanger 62 is by-passed and the feed oil is mixed with cooled slurry from lines 168 and 172 and this mixture is passed through cooler 84. When heat exchanger 62 is by-passed, valve 65 in bottoms line 64 is closed and all the bottoms from line 152 pass through heat exchanger 158. The catalyst-solid slurry or bottoms containing solid particles from lines 168 and 172 admixed with the feed oil are passed to the reaction zone 12 through line 18.

In passing upwardly through the fractionating tower 26 the reaction product vapors are subjected to fractionation and lighter hydrocarbon constituents pass upwardly through the fractionating tower. In the specific fractionator shown in the drawing, provision is made for the separate withdrawal of different fractions or side streams. This showing is by way of example only and the invention is not to be restricted thereto as any number of desired cuts may be taken.

As shown in the drawing, a relatively heavy fraction is withdrawn as a side stream through line 182 and passed to a separator 184 to separate vapors from a liquid and the liquid is withdrawn through line 186. The liquid comprises a heavy cycle oil. The separated vapors are returned from the top of the separator 184 through line 188 to the fractionating tower 26.

Higher up on the fractionating tower 26 another side stream is withdrawn through line 192 and passed to a separator 194 for separating vapors from a liquid. The liquid, comprising a heating oil, is withdrawn through line 196 and the vapors leaving the top of the separator 194 are returned to the fractionating tower 26 through line 202.

Higher up on the fractionating tower 26 another side stream is withdrawn through line 204 and passed to a separator 206 for separating vapors from liquid. The liquid, comprising a heavy naphtha, is withdrawn from the bottom of the separator through line 208 and the vapors are returned to the fractionating tower 26 through line 212.

Leaving the top of the fractionating tower through line 214 are vapors and gases containing light naphtha constituents and normally gaseous constituents. These vapors and gases are further treated in any suitable or conventional manner for separating the motor fuel containing gasoline constituents from normally gaseous constituents.

Where insufficient heat is produced during regeneration in the regeneration zone 10, further heat may be supplied to the solid particles by firing the regeneration zone. Or, if the amount of heat produced during regeneration varies with different oil stocks, the heat produced in the regeneration zone may be maintained substantially constant by firing the regeneration zone. For this firing suitable combustible material such as fuel oil or the like is introduced into the bottom portion of the regeneration zone 10 through line 220 below distribution plate 122 for admixture with the fouled solid particles introduced into regeneration zone 10 through line 14. In some cases it is preferred to omit or by-pass heat exchanger 62 and include heat exchanger or cooler 84 so that the oil stock is cooled rather than heated and heat is supplied to the regeneration zone by firing through line 220 to maintain the temperature substantially constant during regeneration.

A specific example will now be given in connection with the invention but it is to be understood that the invention is not to be restricted thereto. The finely divided solid particles contain catalyst particles and substantially catalytically inert solid heat carriers. The heat carriers and the catalyst particles are preferably of such size, shape and density that there is substantially no separation or segregation of the catalytic and inert particles during the operation of the process. Preferably, the catalyst particles and heat carrier particles are of a size between about 200 and 400 standard mesh or finer. The catalyst particles may comprise any suitable catalytic material such as acid treated bentonite clays, synthetic gels comprising silica and alumina, silica and magnesia, or the like. The inert heat carrier may comprise kieselguhr, pumice, etc.

In the preferred example, finely divided acid treated bentonite clay is used as the catalyst and finely divided pumice particles are used as the heat carrier particles.

The oil feed may comprise reduced crude, gas oil or similar relatively heavy oils. In this example a low coke-forming gas oil having an A. P. I. gravity of about 25° and a mid boiling point between about 500° F. and 800° F. is used. The gas oil fed into line 42 is at a temperature of about 100° F. to 150° F. In the scrubber 32 the oil feed is contacted with cooled regeneration gases which are at a temperature of about 450° F. to 600° F. and the oil feed is heated to a temperature of about 230° F. to 350° F. The preheated oil feed in passing through heat exchanger 62 and after mixture with at least a portion of the bottoms from the fractionating tower 26 is heated to a temperature of about 300° F. to 550° F. The preheated oil is then mixed with hot regenerated catalyst and solid heat carrier particles from the standpipe 16.

To obtain about 45% conversion to gasoline the temperature in the reaction zone 12 is preferably maintained at about 980° F. In order to maintain this temperature, the ratio of solid particles including catalyst particles by weight to oil by weight is about 18 to 1 and in order to maintain the desired conversion, the catalyst to oil ratio by weight is about 5.4 to 1. The hot regenerated catalyst and heat carrier particles leave the regeneration zone 10 at about 1150° F. which is the temperature at which the regeneration is carried out.

In passing through the reaction zone 12 the velocity of the vapors is about 18 feet per second but this velocity may vary. In the separator 22 above the reaction zone 12 the velocity of the vapors is about 0.5 to 1 foot per second or less.

The velocity of the regeneration gases in the separator 27 above the regeneration zone 10 is about 1 foot per second. The velocity of the gases in the regeneration zone 10 is somewhat higher than in the separator 27 but is not a high velocity. In the regeneration zone 10 the fluidized mixture of solid particles and regeneration gases has a density of about 15 pounds per cubic foot. In the reaction zone 12 the suspension of solid particles in the vapors has a density of about 5 pounds per cubic foot. Preferably, the regeneration zone is maintained under about 15 pounds per square inch gauge. The pressure in separator 22 is about 8.0 pounds per square inch gauge.

Under these conditions about 5.5% carbon by weight will be deposited on the solid catalyst particles and heat carrier particles and in regeneration the carbonaceous material will be reduced to about 1% by weight on the regenerated catalyst.

The heat exchanger 84 is provided for controlling the temperature of the preheated feed. Where a low coke-forming stock is used and lower amounts of carbonaceous material are deposited on the catalyst particles, higher preheating temperatures are necessary for the oil feed to increase the carbonaceous deposits on the solid particles. Under certain circumstances higher amounts of carbonaceous material may be obtained as with a high coke-forming stock. In this case the heat exchanger 84 is brought into use to remove part of the heat from the preheated feed oil. The by-pass line 72 and heat exchanger 84 form a flexible means for controlling the temperature of the feed oil passing to the reaction zone 12.

By maintaining the regeneration zone under super-atmospheric pressure, it is possible to support the regeneration zone near ground level and this eliminates costly supporting structure necessary for supporting the large and heavy regeneration zone at high levels.

In the above specific example it was stated that the catalyst and inert particles are of such size, shape and density that no segregation occurs. In some cases it may be desirable to select smaller or lighter catalyst particles to have more catalyst particles pass overhead into scrubber 32 and separator 22 than pass overhead when the catalyst and solid heat carrier particles are so selected that no separation or segregation occurs. In these cases the catalyst particles will have a shorter residence time in the reaction and regeneration zones. Or, the solid inert particles may be selected so that they are smaller or lighter and more will pass overhead to a greater extent. In the latter case the catalyst particles will have a longer residence time in the reaction and regeneration zones. From the above it will be seen that by selecting the catalyst and solid particles, variations in the process are obtained.

While the invention has been particularly described in connection with catalystic cracking of oils, it is to be understood that it may also be used in other catalytic reactions such as oxidation, reduction, reforming, etc.

While one form of apparatus has been shown in the drawing, and a specific example for operating a process according to the invention have been disclosed, it is to be understood that these are by way of illustration only and that various changes and modifications may be made without departing from the spirit of the invention.

What is claimed is:

1. A process of catalytically converting relatively high boiling hydrocarbons to lower boiling hydrocarbons which comprises mixing liquid hydrocarbons at a relatively low temperature with finely divided solid particles containing catalyst particles and at a temperature above conversion temperature to vaporize and raise the liquid hydrocarbons to conversion temperature, passing the mixture upwardly through a reaction zone at a relatively high velocity thereby maintaining at a relatively low density the mixture in the reaction zone, separating fouled solid and catalyst particles from vaporous reaction products leaving said reaction zone, stripping the separated fouled solid and catalyst particles to remove volatile hydrocarbons, mixing a regenerating gas with the fouled solid and catalyst particles and passing the mixture upwardly into a regeneration zone, maintaining a relatively low velocity of the regeneration gas so that the solid and catalyst particles are regenerated in a dense phase, withdrawing hot regenerated solid and catalyst particles from the lower portion of said regeneration zone and using them as the solid particles to be mixed with the relatively low temperature liquid hydrocarbons in the first step of the process and withdrawing hot regeneration gases from the upper portion of said regeneration zone.

2. A process according to claim 1 wherein the withdrawn regeneration gases are partly cooled and then scrubbed to remove entrained catalyst particles with feed liquid hydrocarbons comprising a high coke-forming stock which is thereby preheated, and cooling the preheated feed liquid hydrocarbons before passing them to said reaction zone.

3. A process for carrying out catalytic reactions which comprises mixing finely divided solid particles containing catalytic particles heated to a temperature above the reaction temperature desired in a reaction zone with reactants at a relatively low temperature below reaction temperature to heat the reactants to the desired reaction temperature by the solid particles, passing the mixture upwardly through a narrow vertical reaction zone so that the velocity of the reactants is relatively high, separating at an elevated point the fouled solid particles from the reaction products leaving the top of said reaction zone, introducing the separated fouled solid particles into the top of a standpipe to produce a pressure at the bottom thereof, passing the fouled solid particles at an increased pressure into the bottom portion of a regeneration zone maintained under superatmospheric pressure and at a lower level than the top of said reaction zone, adding regenerating gas to said regeneration zone and maintaining the velocity of said up-flowing regenerating gas at a low velocity so that the solid particles in said regeneration zone are maintained in a dense phase, withdrawing regenerated solid particles above reaction temperature from the lower portion of said regeneration zone under sufficient pressure to pass them to said reaction zone and using them as the solid particles to be mixed with the reactants in said reaction zone.

4. An apparatus of the character described including a single tubular vertical reactor of restricted but uniform cross section and having a top outlet, means for introducing reactants and finely divided contact solid into the bottom portion of said reactor, means for separating fouled solids from vaporous reaction products leaving said reactor outlet, said separating means being arranged at an elevated level, a standpipe communicating at its upper end with said separating means for receiving fouled solid particles therefrom, means whereby the fouled solid particles are passed from the lower end of the standpipe to the bottom portion of a regenerator and means for introducing regenerating gas into the bottom portion of said regenerator whereby the solid particles therein are fluidized, said regenerator being provided at its lower portion with an outlet associated with said means for introducing fluidized contact solid into said reactor.

5. An apparatus according to claim 4 including means associated with the regenerator whereby said regenerator is maintained under superatmospheric pressure and said standpipe is of such a height as to develop sufficient pressure to pass the fouled solids to said regenerator.

6. An apparatus of the character described including a single tubular vertical reactor of restricted but uniform cross section and having a top outlet, means for introducing reactants and finely divided contact solid into the bottom portion of said reactor, means for separating fouled solids from vaporous reaction products leaving said reactor outlet, said separating means being arranged at an elevated level, a standpipe communicating at its upper end with said separating means for receiving fouled solid particles therefrom, means whereby the fouled solid particles are passed from the lower end of the standpipe to the bottom portion of a regenerator and means for introducing regenerating gas into the bottom portion of said regenerator whereby the solid particles therein are fluidized, said regenerator being provided at its lower portion with an outlet associated with said means for introducing fluidized contact solid into said reactor, said reactor extending upwardly beyond said regenerator.

HOMER Z. MARTIN.